United States Patent [19]

Abe et al.

[11] Patent Number: 4,932,368
[45] Date of Patent: Jun. 12, 1990

[54] SUCTION ARRANGEMENT FOR INTERNAL COMBUSTION ENGINE

[75] Inventors: Ryoji Abe; Setsuo Harada; Kouji Asanomi; Kouichi Hatamura; Toshikazu Kurokawa; Tsuyoshi Goto; Shinji Seike, all of Hiroshima, Japan

[73] Assignee: Mazda Motor Corporation, Hiroshima, Japan

[21] Appl. No.: 303,658

[22] Filed: Jan. 30, 1989

[30] Foreign Application Priority Data

Jan. 28, 1988 [JP] Japan .................................. 63-18089
Mar. 19, 1988 [JP] Japan .................................. 63-66788
Mar. 19, 1988 [JP] Japan .................................. 63-66789
Apr. 8, 1988 [JP] Japan .................................. 63-87565

[51] Int. Cl.⁵ .......................................... F02M 35/10
[52] U.S. Cl. ........................... 123/52 MV; 123/559.1; 123/563
[58] Field of Search ......... 123/52 M, 52 MV, 52 MB, 123/52 MC, 563, 559.1

[56] References Cited

U.S. PATENT DOCUMENTS

| | | | |
|---|---|---|---|
| 4,480,600 | 11/1984 | Gill ................................ | 123/195 R |
| 4,633,844 | 1/1987 | Okimoto ........................ | 123/559.1 |
| 4,653,439 | 3/1987 | Desai et al. .................... | 123/52 MV |
| 4,702,203 | 10/1987 | Ohmi et al. .................... | 123/52 MV |
| 4,821,684 | 4/1989 | Tasaka ........................... | 123/52 MV |
| 4,827,879 | 5/1989 | Ohmi et al. .................... | 123/52 MV |

FOREIGN PATENT DOCUMENTS

| | | | |
|---|---|---|---|
| 198062 | 11/1957 | Austria ........................... | 123/559.1 |
| 0116820 | 6/1985 | Japan .............................. | 123/559.1 |
| 61-1624 | 1/1986 | Japan . | |
| 61-5330 | 1/1986 | Japan . | |
| 61-78250 | 5/1986 | Japan . | |
| 0244827 | 10/1986 | Japan .............................. | 123/559.1 |
| 0048923 | 3/1987 | Japan .............................. | 123/563 |
| 0248917 | 10/1988 | Japan .............................. | 123/559.1 |

Primary Examiner—David A. Okonsky
Attorney, Agent, or Firm—Wenderoth, Lind & Ponack

[57] ABSTRACT

In a V-type internal combustion engine having a pair of upwardly diverging cylinder banks and an auxiliary unit disposed at an upper portion in a space defined between the cylinder banks, a suction arrangement includes intake ports provided at an inner side of the respective cylinder banks, inclined inwardly by a predetermined angle with respect to respective clyinder axes, and extending upwardly in a generally vertical direction so as not to interfere with the auxiliary unit, and cylinder communicating portions connected to upper portions of the intake ports in communication with the respective cylinders to permit the introduction of the intake gas thereto.

11 Claims, 7 Drawing Sheets

SUCTION ARRANGEMENT FOR INTERNAL COMUBSTION ENGINE

BACKGROUND OF THE INVENTION

The present invention generally relates to an internal combustion engine, and more particularly, to a suction arrangement of a V-type internal combustion engine provided with an auxiliary unit, especially, a mechanical supercharger or the like in a space defined between a pair of upwardly diverging left and right side cylinder banks.

Conventionally, as disclosed, for example, in Japanese Utility Model Laid-Open Publication Jikkaisho No. 61-5330, there has been proposed an arrangement in which a mechanical supercharger is disposed between upwardly diverging left and right side cylinder banks of a V-type internal combustion engine for achieving compactness of said engine. Normally, respective cylinders of a V-type internal combustion engine of this kind are a cross-flow type in which exhaust ports are provided outside the cylinder banks, and intake ports are provided at the inner side of the cylinder banks. As also disclosed in the above publication, it is usual intake passages for the left and right side cylinder banks to be curved generally in a horizontal direction and extend to the inner side of the cylinder banks so as to be connected to a delivery port of the mechanical type supercharger. In the above case, however, the layout of the intake passage, manifolds, or inter-cooler, etc., are considerably restricted by the provision of the supercharger in the space between the left and right side cylinder banks, with a consequently large degree of curvature of the intake passage, thus undesirably contributing to large suction resistance.

Incidentally, instead of designing the left and right side intake passages to curve in a horizontal direction so as to be brought under the supercharger as described above, there may be conceived an arrangement in which, by providing intake ports, intake passages of respective cylinder banks are directed in a vertical direction at opposite sides of the supercharger for communicating with said supercharger through manifold pipes at the upper portion of the intake passages. In the above arrangement, comparatively less suction resistance may be expected since the curvature of the intake passages can be relatively small. However, when the intake passages are provided at the opposite sides of the supercharger in the vertical direction, it becomes difficult to properly dispose fuel injectors, with respect to position and orientation, in the vicinity of the intake ports. When the fuel injectors are not provided in the proper position and orientation, a problem arises in that combustion efficiency is deteriorated due to the adhesion of fuel components onto cylinder wall surfaces.

SUMMARY OF THE INVENTION

Accordingly, an essential object of the present invention is to provide a suction arrangement of an internal combustion engine in which an auxiliary unit such as a mechanical type supercharger, etc. is provided in a space between a pair of upwardly diverging left and right side cylinder banks to thereby realize a compact V-type internal combustion engine in which suction resistance and adhesion of fuel components onto cylinder wall surfaces are suppressed.

In accomplishing the above object, according to one aspect of the present invention, attention is directed to the fact that suction resistance may be suppressed by minimizing the curvature of intake passages by designing the intake passages to extend in a vertical direction at opposite sides of an auxiliary unit such as a mechanical type supercharger or the like installed between a pair of upwardly diverging left and right side cylinder banks of the internal combustion engine. Consequently, space for accommodating fuel injectors at proper positions and orientations is realized.

More specifically, according to the present invention, there is provided a V-type internal combustion engine including a pair of upwardly diverging cylinder banks and an auxiliary unit disposed in a space defined between said cylinder banks, and provided with a suction arrangement which comprises intake passages of the respective cylinder banks provided at opposite sides of said auxiliary unit in a generally vertical direction, and connecting portions of the respective intake passages with upper manifold portions. The connecting portions are outwardly curved, and also provided with fuel injectors disposed inwardly of the respective curved portions and directed towards respective intake ports of said cylinder banks.

According to the V-type internal combustion engine having the structure described above, the space between the left and right side cylinder banks is effectively occupied by the auxiliary unit such as the mechanical type supercharger and the like, and thus, the engine is compact due to the elimination of wasteful space. Moreover, since the intake passages extend in the vertical direction at opposite sides of the auxiliary unit provided between the left and right side cylinder banks, the space at both sides of the auxiliary unit can also be effectively utilized, while simultaneously, intake passages having a small amount of curvature and offering low suction resistance may be formed. Due to the fact that the portions of the intake passages connected with the upper manifold portions are outwardly curved, with the injectors being disposed in the spaces defined inwardly of the curved portions, it is possible to inject the fuel in a proper direction toward the intake ports from positions comparatively close to such intake ports.

Furthermore, since the intake passages extending to the upper manifold portions are relatively long, the filling efficiency is high due to a resonance effect created during low speed operation, thus resulting in the improvement of torque at such low speed operation.

Another object of the present invention is to provide an internal combustion engine of the above-described type in which the suction system of the engine including the supercharger and a bypass passage thereof is compact, while suction resistance is advantageously suppressed.

According to the present invention, the above object is achieved according to the design of the bypass pipe. More specifically, there is provided a V-type internal combustion engine including a pair of upwardly diverging cylinder banks, a mechanical supercharger disposed at the upper portion of said internal combustion engine, an inter-cooler disposed upstream of said supercharger, and a suction arrangement which comprises a delivery port open at the upper portion of the supercharger and extending forwardly to be connected to an intake pipe leading to respective cylinders through said inter-cooler, a rear inlet port of the supercharger to which a suction pipe at the downstream side of an air cleaner is connected, and a bypass pipe for connecting the suction pipe located upstream of said supercharger with said delivery port formed at the upper portion of said supercharger.

In the above arrangement according to the present invention, since the supercharger is disposed at the upper portion of the engine, with the bypass pipe connecting the inlet port at the rear of the supercharger with the delivery port extending forwardly from the upper opening, the bypass pipe is short so as to be compactly disposed in the space above the supercharger. Meanwhile, because the inter-cooler is provided in the space in front of the supercharger and connected to the delivery port extending forwardly from the upper portion of the supercharger, the piping therebetween and the intake passages extending from the inter-cooler to the respective cylinders may be compact yet extend a sufficient passage length, and offer a small suction resistance. Moreover, since the inlet port of the supercharger is provided at the rear portion thereof so as not to interfere with piping at the side of the inter-cooler etc., the suction pipe leading to the air cleaner can be short and readily installed.

A further object of the present invention is to provide a suction arrangement of an internal combustion engine of the above described type, which provides a sufficient amount of intake by suction and is compact by providing a proper means for reducing the suction resistance, while avoiding interference between the intake ports and the auxiliary unit such as a supercharger or the like.

For accomplishing the above object, according to a further aspect of the present invention, there is provided a V-type internal combustion engine including a pair of upwardly diverging cylinder banks, an auxiliary unit disposed at an upper portion in a space defined between said cylinder banks, a suction arrangement which comprises intake ports provided at an inner side of the respective cylinder banks, said parts being inclined inwardly by a predetermined angle with respect to respective cylinder axes, extending upwardly in a generally vertical direction so as not to interfere with said auxiliary unit, and cylinder communicating portions connected to upper portions of said intake ports for communicating with the respective cylinders to introduce intake gas thereto.

Since the suction ports extend in a generally vertical direction and are connected with the respective cylinder communicating portions to avoid interference between the suction ports and the auxiliary unit such as the supercharger, etc., the auxiliary unit may be provided immediately above the space between the cylinder banks instead of being disposed at the upper portion of the intake ports, and thus, the total height of the engine may be minimized as far as practicable. Furthermore, since the intake ports are inclined inwardly a predetermined degree with respect to the cylinder axes, the suction resistance can be reduced as far as possible due to the feeding of the intake gas toward the central portion of each cylinder, and consequently, a sufficient intake may be achieved in the respective combustion chambers.

A still further object of the present invention is to provide a suction arrangement of an internal combustion engine of the above-described type in which the suction resistance is kept to a minimum due to an overall intake passage length, cooling capacity of intake gas coolers is improved, and engine output is improved through the effective utilization of an inertia effect on the intake gas.

For achieving the above object, according to the present invention, there is provided a V-type internal combustion engine including a pair of upwardly diverging cylinder banks, a supercharger disposed in a generally V-shaped space defined between the cylinder banks and extending along said cylinder banks in the longitudinal direction of a crank shaft, and a suction arrangement. The suction arrangement comprises a common intake passage at an upstream side of the supercharger connected to a suction port of said supercharger at a rear side thereof, a set of two intake gas coolers extending longitudinally in a direction perpendicular to the longitudinal axis of the crank shaft and disposed side by side at left and right positions to the front portion of the internal combustion. An upstream end of the common intake passage downstream from said supercharger is connected to a delivery port of said supercharger at a front side thereof. A downstream end of the intake passage is connected to intake stream inlet ports located in the vicinity of the ends, at a central part of the engine as taken in a widthwise direction of the vehicle, of said two intake gas coolers. Surge tanks are provided at the sides of both cylinder banks so as to extend in the direction of the longitudinal axis of the crank shaft. And, two branched intake passages connect respective intake stream outlet ports, and are disposed in the vicinity of ends, at an outer side of the engine as taken in the widthwise direction of the motor vehicle, of said two intake gas coolers.

According to the present invention as described above, since the supercharger is disposed in a generally V-shaped space between the left and right side cylinder banks so as to extend in a longitudinal direction of the engine, with the intake passage as the upstream side and the downstream side thereof being respectively connected with the supercharger at locations spaced apart in the longitudinal direction of the engine, the supercharger and the intake passages at the upstream side and downstream side thereof hardly project from the upper portion of the engine main body and are compactly disposed within the generally V-shaped space between the cylinder banks. Moreover, since the intake gas coolers have a flat configuration and are longitudinally disposed immediately in front of the engine, the intake gas coolers only occupy the space in front of the engine defined by the thickness thereof and the slight distance therebetween. Accordingly, the suction system may be compact, and the overall intake passage length can be reduced for improving fuel efficiency by suppressing the suction resistance. Furthermore, due to the longitudinal disposition of the engine, with the intake gas coolers being provided immediately in front of the engine, it is possible to provide a projecting area of the intake gas coolers that is as large as possible with respect to the longitudinal direction of the engine, i.e., in the direction of flow of the atmosphere. Therefore, a sufficient amount of cooling air is supplied to the intake gas coolers so as to facilitate the cooling performance of the intake gas coolers.

Additionally, since the branched intake passages for connecting the intake gas coolers with the surge tanks extend from the outer side, as taken in the widthwise direction of the vehicles, of the intake gas coolers (disposed close to the forward end portion of the engine) toward the rear in the longitudinal direction of said engine, the intake passage length between the intake gas coolers and the respective cylinders is not very long. However, a proper length may be achieved therebetween to allow effective utilization of the inertia effect of the intake gas, thus making it possible to improve the engine output.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
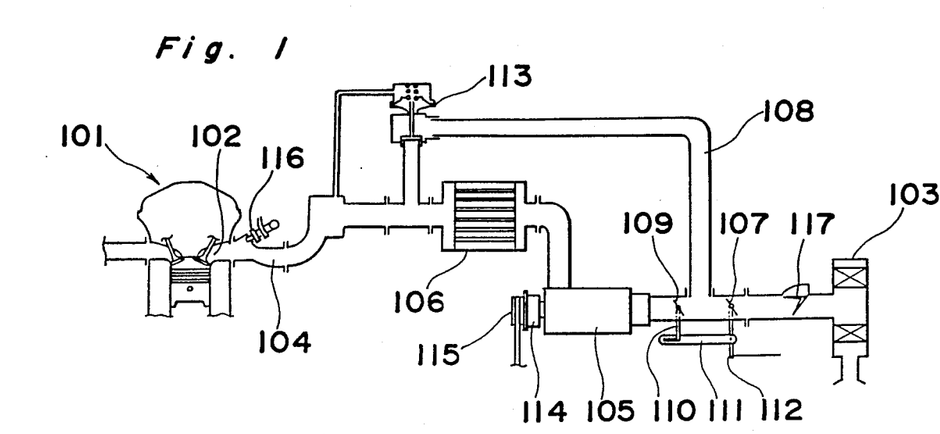
FIG. 1 is a schematic diagram of a supercharging system of an internal combustion engine according to one preferred embodiment of the present invention.

Referring now to the drawings, there is schematically shown in FIG. 1 a suction arrangement or mechanical supercharging system for an internal combustion engine according to one preferred embodiment of the present invention, which includes a mechanical type supercharger 105 provided in an intake passage 104 which places an intake port 102 of an internal combustion engine 101 in communication with an air cleaner 103 as illustrated. The mechanical type supercharger 105 is based on a so-called Lysholm type screw compressor composed of a combination of four male rotors and a female rotor having six grooves. At the downstream side of the supercharger 105, an inter-cooler 106 of an air-cooling type is disposed in the intake passage 104. A throttle valve 107 is provided at the upstream side of the supercharger 105 in the intake passage 104, and a by-pass passage 108 for by-passing the supercharger 105 in the passages 104 places the downstream side of the throttle valve 107 in communication with that of the inter-cooler 106. There is further provided an auxiliary throttle valve 109 immediately at the downstream side of a location at which the by-pass passage 108 branches from the intake passage 104. The auxiliary throttle valve 109 is coupled with a throttle valve lever 112 through an auxiliary throttle valve lever 110 and a grooved rod 111, and the auxiliary throttle valve 109 is arranged to start opening when the throttle valve 107 has opened to a predetermined degree. The by-pass passage 108 is also provided with a by-pass valve 113 of a diaphragm type, and in a non-supercharging region, this by-pass valve 113 is opened to effect a natural suction without intake air passing through the supercharger 105. The supercharger 105 is coupled to a variable pulley (not shown) at the prime mover side through a magnetic clutch 114 and a variable pulley 115 of a centrifugal type. In the intake passage 104, in a position close to the intake port 102, a fuel injector 116 is provided, while at the downstream side of the air cleaner 103, an air flow meter 117 is disposed.

Figure 2:
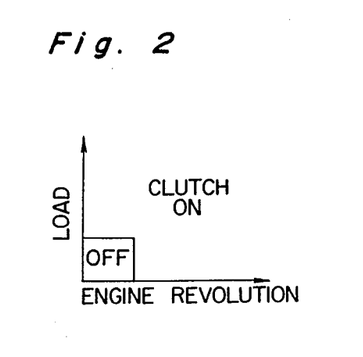
FIGS. 2 and 3 are graphical representations of characteristics of the engine supercharging system of FIG. 1.
Figure 3:
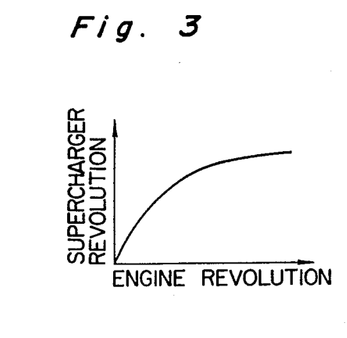

As shown in FIG. 2, the magnetic clutch 114 is cut off in a low revolution/small load region of operation of the engine, and is turned on at other regions. Meanwhile, the variable pulley 115 and the driving side variable pulley operatively associated therewith are in themselves known as centrifugal pulleys fundamentally. And, by the proper combination thereof, the revolution of the supercharger 105 is gradually increased to a maximum as the engine revolutions increase, i.e., the supercharging pressure will not be raised too excessively in the high revolution region of operation of the engine as shown in FIG. 3. Accordingly, in the first place, in the low revolution/small load region of operation of the engine, the supercharging is suspended since the magnetic clutch 114 is cut off. And, in the other regions, since a control that will suppress the excessive rise in the supercharging pressure is effected at the high revolution side, while sufficient suction is maintained at the low revolution side, it is possible to effect natural suction through the by-pass passage 108 by suspending or suppressing the supercharging in the small load region, without employing a specific means giving rise to both thermally and efficiency related problems when suppressing the supercharging by effecting suction relief. Moreover, due to the fact that the amount of air itself to be fed into the supercharger 105 is adjusted by the throttle valve 109 referred to earlier, a control of the supercharging pressure with respect to the load is effected. Accordingly, by the combination of the magnetic clutch 114, variable pulley 115 and auxiliary throttle valve 109, the suspension and/or suppression of supercharging at the small load region, and also, the suppression of supercharging in correspondence with the engine revolution and load in other operating regions may be efficiently realized. In the small load region, the by-pass valve 113 is opened by the suction, and natural suction through the by-pass passage 108 is effected.

Referring further to FIGS. 4 to 8 showing the overall suction structure of the internal combustion engine according to one preferred embodiment of the present invention, the V-type internal combustion engine 101 includes a cylinder block having a pair of right and left side banks L and R oppositely inclined into a V-shape. Each of the banks L and R is formed with three cylinders which are offset by a predetermined amount, and numbered from the front as #1, #3 and #5 in the left bank and #2, #4 and #6 in the right bank thus six cylinders are provided, in which pistons re respectively accommodated in a known manner for reciprocating therein.

Figure 6:
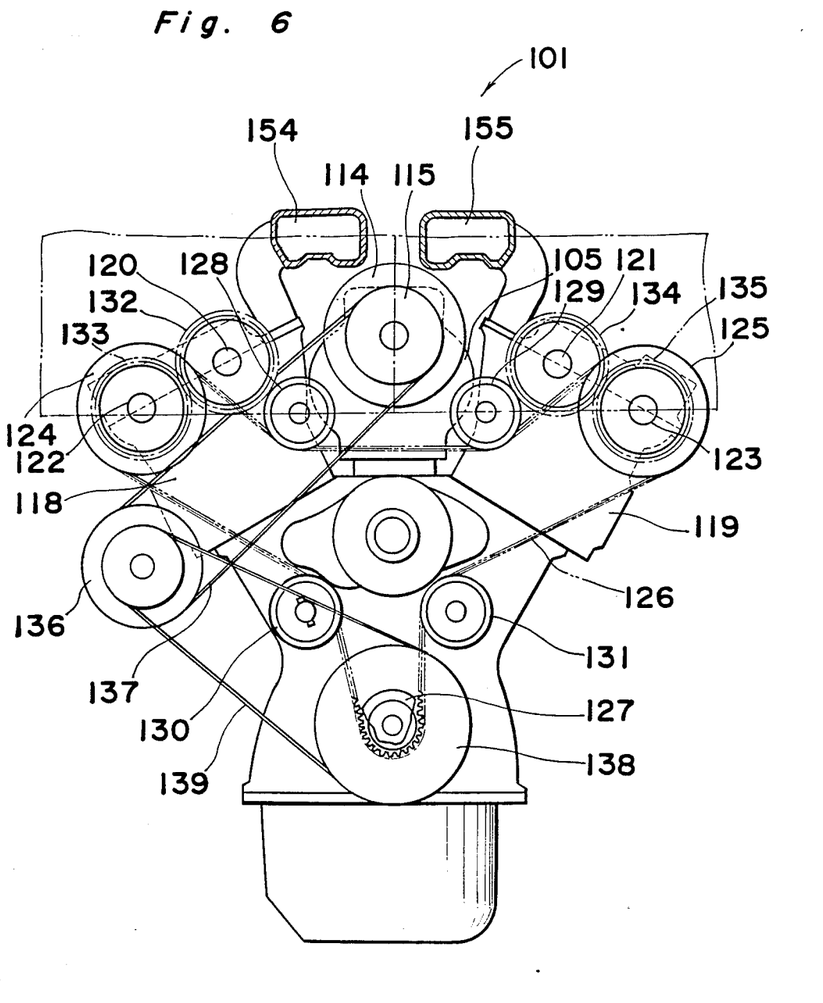
FIG. 6 is a front elevational view partly in section of the arrangement of FIG. 4.

At the upper portion of cylinder heads 118 and 119 of the respective banks L and R (FIG. 7), there are provided suction side cam shafts 120 and 121 at the inner side, and exhaust side cam shafts 122 and 123 at the outer side, respectively. At the front side ends of the exhaust side cam shafts 122 and 123 are mounted, pulleys 124 and 125. These pulleys 124 and 125 are coupled with a crank shaft side pulley 127 through a timing belt 126, the tension and angle of contact of which belt 126 are adapted to be adjustable by set of idler pulleys 128 and 129 at an upper portion of the engine, and another set of tensioner pulleys 130 and 131 at a lower portion (FIG. 6). Meanwhile, the suction side cam shafts 120 and 121 disposed at the inner sides of the banks are coupled with the exhaust side cam shafts 122 and 123 of the respective banks by sets of gears 132 and 133, and 134 and 135.

As described above, since only the exhaust side cam shafts 122 and 123 at the outer side are directly driven by the timing belt 126, with said timing belt 126 being positioned downwardly by the idler pulleys 128 and 129 (FIG. 6), space for the supercharger 105 and its driving pulley 115 is provided at the front of the engine.

Lysholm type of supercharger 105 is longitudinally disposed in the space defined between the left and right banks L and R. To the front end of the supercharger 105 is connected a driving pulley 115 through a magnetic clutch 114. A belt 137 passes around the driving pulley 115 and a large diameter portion of a driven pulley 136 provided at the front left side of the engine 101. Another belt 139 is directed around a small diameter portion of the driven pulley 136 and a prime mover pulley 138 having a large diameter provided on the crank shaft of the engine 101. The small diameter portion of the driven pulley 136 and the large diameter portion of the prime mover pulley 138 comprise variable pulleys utilizing centrifugal weights. The diameter of the small diameter portion of the driven pulley 136 is increased by centrifugal force, while on the contrary, the diameter of the large diameter portion of the prime mover pulley 138 is reduced by centrifugal force, whereby the revolution of the supercharger 105 is gradually increased to a maximum at high revolutions.

In the cylinder heads 118 and 119 of the left and right banks L and R, combustion chamber recesses 140 and 141, intake ports 102a and 102b open to the recesses 140 and 141, and exhaust ports 142 and 143 are provided, together with intake valves 144 and 145 and exhaust valves 146 and 147 for opening or closing said intake ports 102a and 102b, and exhaust ports 142 and 143. The intake valves 144 and 145 and the exhaust ports 142 and 143. The intake valves 144 and 145 and the exhaust valves 146 and 147 are driven by the suction side cam shafts 120 and 121, and exhaust side cam shafts 122 and 123.

Exhaust passages 148 and 149 extend from the exhaust ports 142 and 143 towards the outer side of the V-shaped cylinder banks so as to be open at the side faces of the cylinder heads 118 and 119 for communicating with exhaust pipes (not shown). On the other hand, the intake passages in the cylinder heads 118 and 119 extend from the intake ports 102a and 102b, open close to the centers of the combustion chamber recesses 140 and 141, slightly towards the inner side of the engine, and immediately thereafter, rise upwardly so as to open at the upper portions of the cylinder heads 118 and 119 having upper openings 150 and 151 to which connecting pipes 152 and 153 are mounted. The connecting pipes 152 and 153 extend upwardly at the inner side of the V-shaped cylinder banks and are connected to manifold pipes 154 and 155 located at the upper portion at the left and right sides of the supercharger 105. Moreover, in the connecting pipes 152 and 153, there are formed fuel injector mounting portions 156 and 157 at inner positions close to the ends of the pipes 152 and 153 attached to the openings 150 and 151 formed on the upper portions of the cylinder heads 118 and 119. In order to secure a space for installing the fuel injectors 116 between the wall surfaces of the connecting pipes 152 and 153 and the supercharger 105 at the upper portions of the injector mounting portions 156 and 157, the upper portions of the connecting pipes 152 and 153 are bent outwardly from the V-shaped cylinder banks. Accordingly, the intake passages 104a and 104b are curved outwardly at the above portions and communicate with the surge tank portions 158 and 159 within the manifold pipes 154 and 155.

Figure 5:
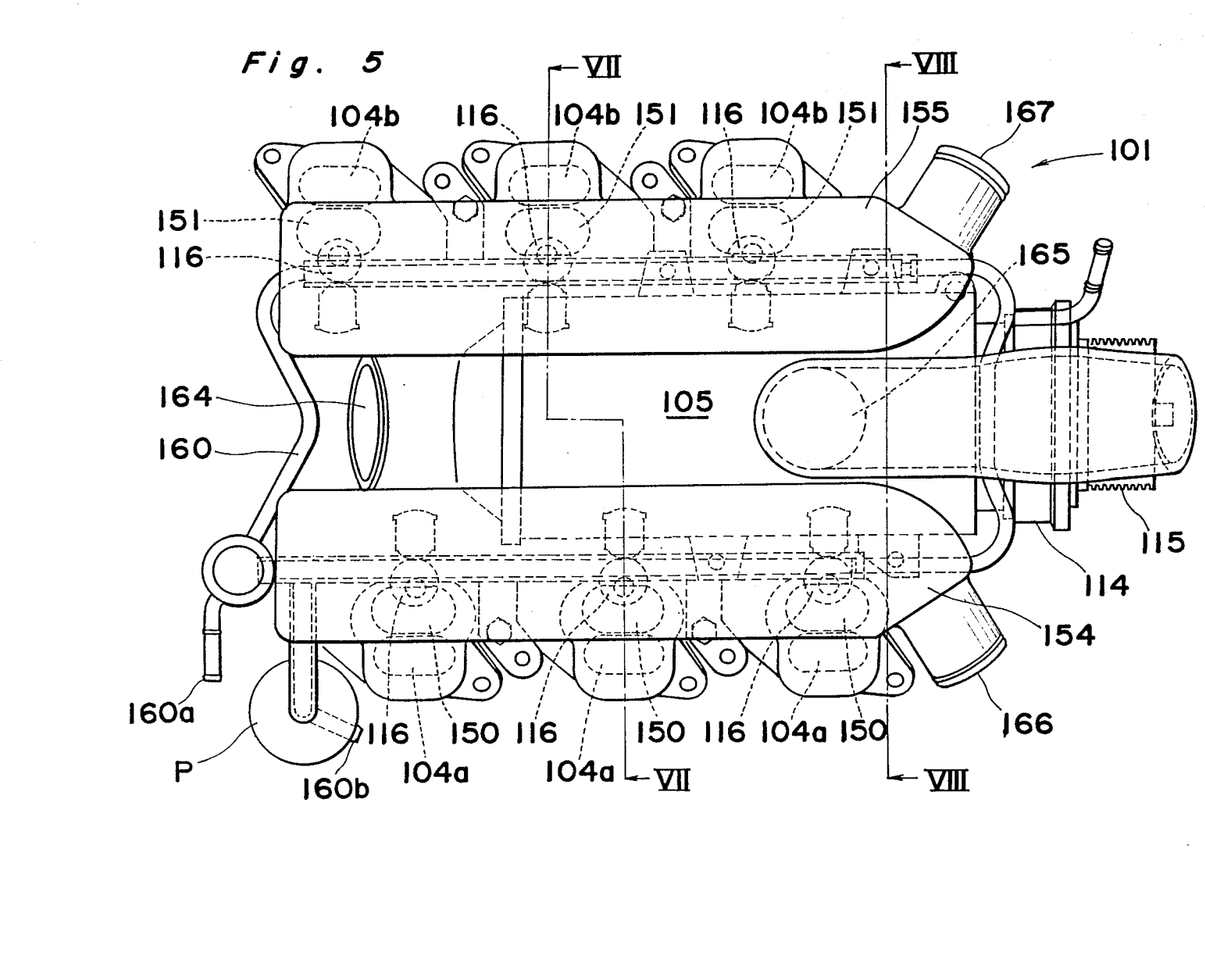
FIG. 5 is a fragmentary top plan view in detail of essential portions in FIG. 4.
Figure 7:
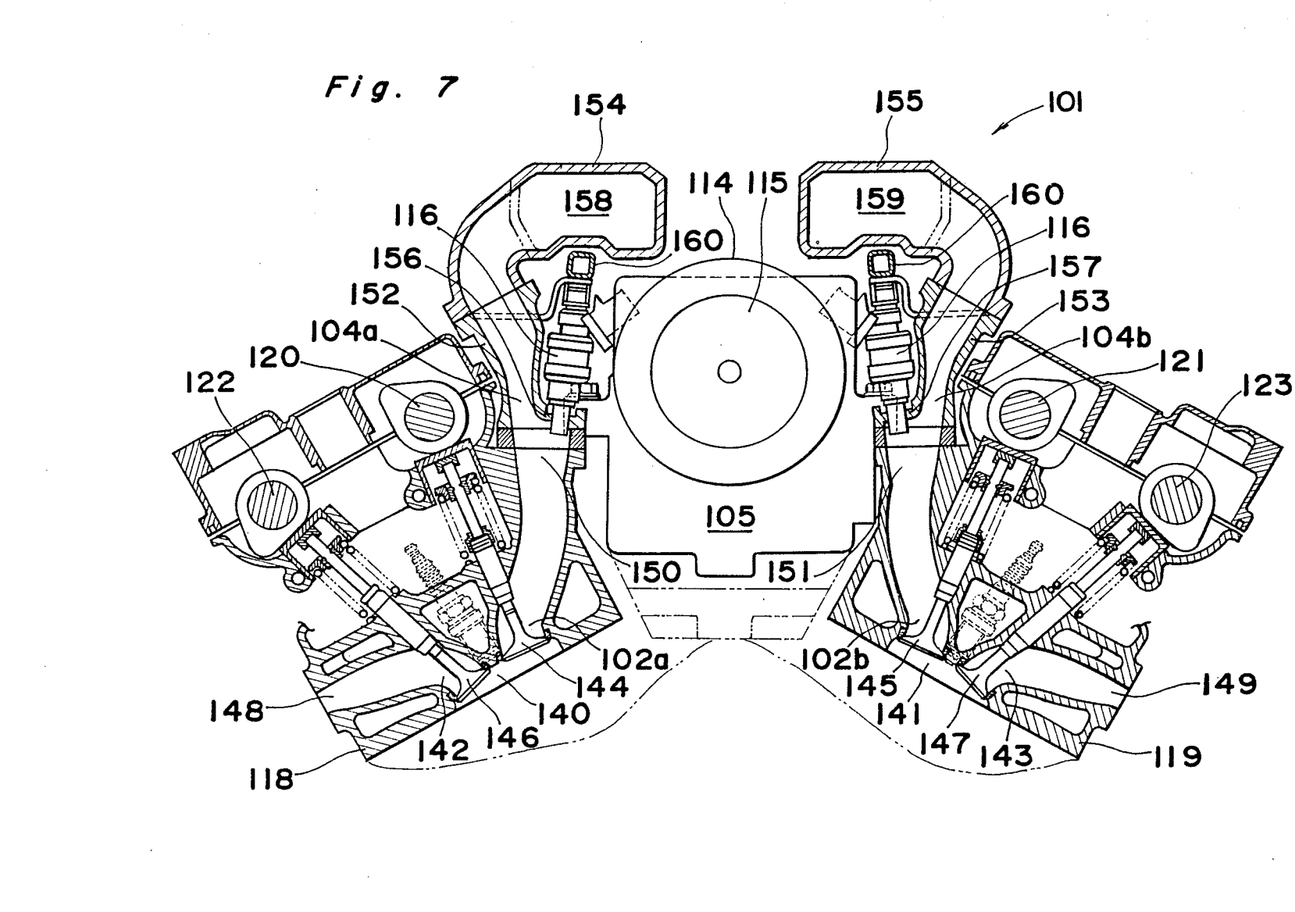
FIG. 7 is a cross-sectional view taken along the line VII—VII in FIG. 5.

The fuel injectors 116 inject fuel from the positions immediately upstream of the openings 150 and 151 of the cylinder heads 118 and 119, towards the intake ports 102a and 102b of the respective cylinders. As shown in FIGS. 5 and 7, a fuel distributing pipe 160 for distributing the fuel into the fuel injectors 116 encircles the space above the respective fuel injectors 116. The fuel in introduced through an inlet end 160a of the pipe 160 so as to be distributed into each injector 116, and after making a round through the pipe 160, is led to an outlet end 160b through a pressure regulator P.

As is most clearly shown in FIG. 5, the supercharger 105 is so disposed that its inlet portion 164 is located at the rear of the engine, while a delivery portion 165 thereof is open at the upper portion of the supercharger 105 and extends towards the front of the engine. Pressurized air is discharged to the front from the delivery portion 165 to an inter-cooler 106 (FIG. 4), and after being divided leftward and rightward, is fed into the manifold pipes 154 and 155 through inlet cooling portions 166 and 167 of the respective manifold pipes.

Figure 4:
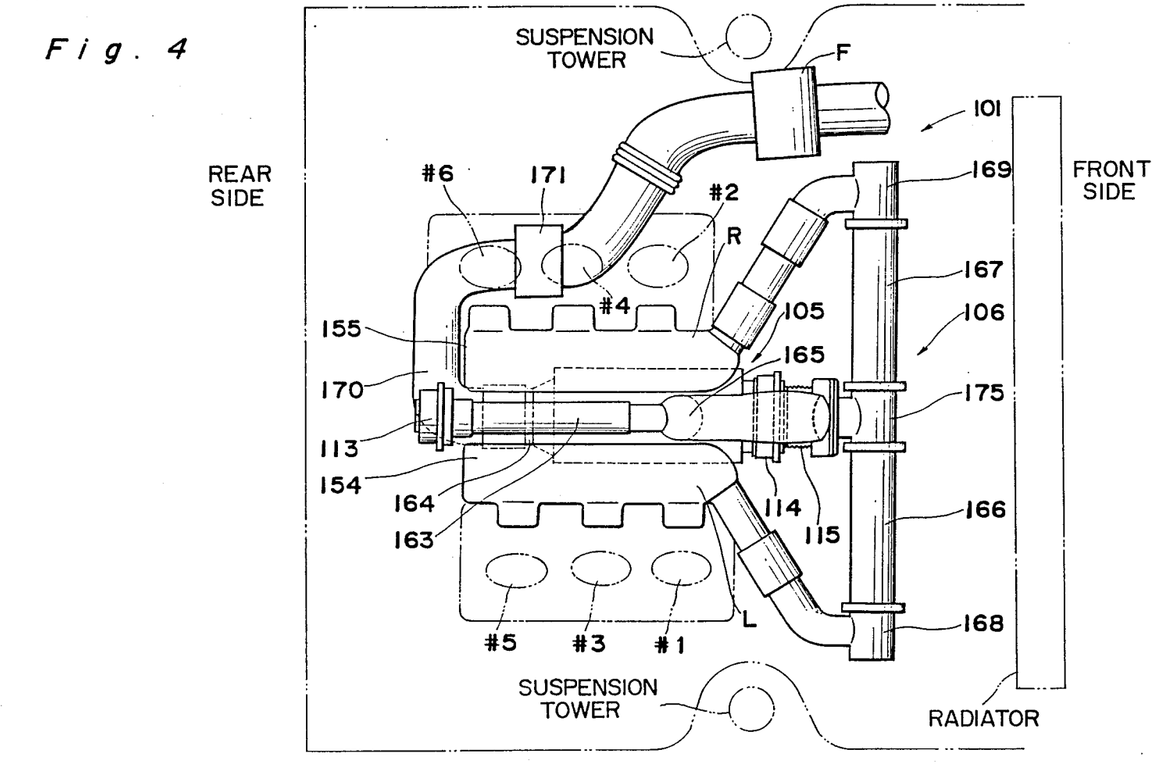
FIG. 4 is a schematic top plan view of a suction arrangement of an internal combustion engine according to the present invention.

The inter-cooler 106 provided upstream of the supercharger 105 includes a central inlet portion 175 coupled, through flanges, with the delivery portion 165 of the supercharger 105, cooling portions 166 and 167 laterally and horizontally extending from said inlet portion 175, and outlet portions 168 and 169 respectively connected to the outer ends of the cooling portions 166 and 167 as shown in FIG. 4. The outlet portions 168 and 169 at the left and right sides of the inter-cooler 106 extend inwardly so as to be respectively connected to the manifold pipes 154 and 155 of the cylinder banks L and R. Meanwhile, a suction pipe 170 is connected to the rear inlet portion 164 of the supercharger 105. At the upstream side of the suction pipe 170, a throttle body 171 is disposed. The pipe 170 is also coupled with an air cleaner F as shown (FIG. 4).

Figure 8:
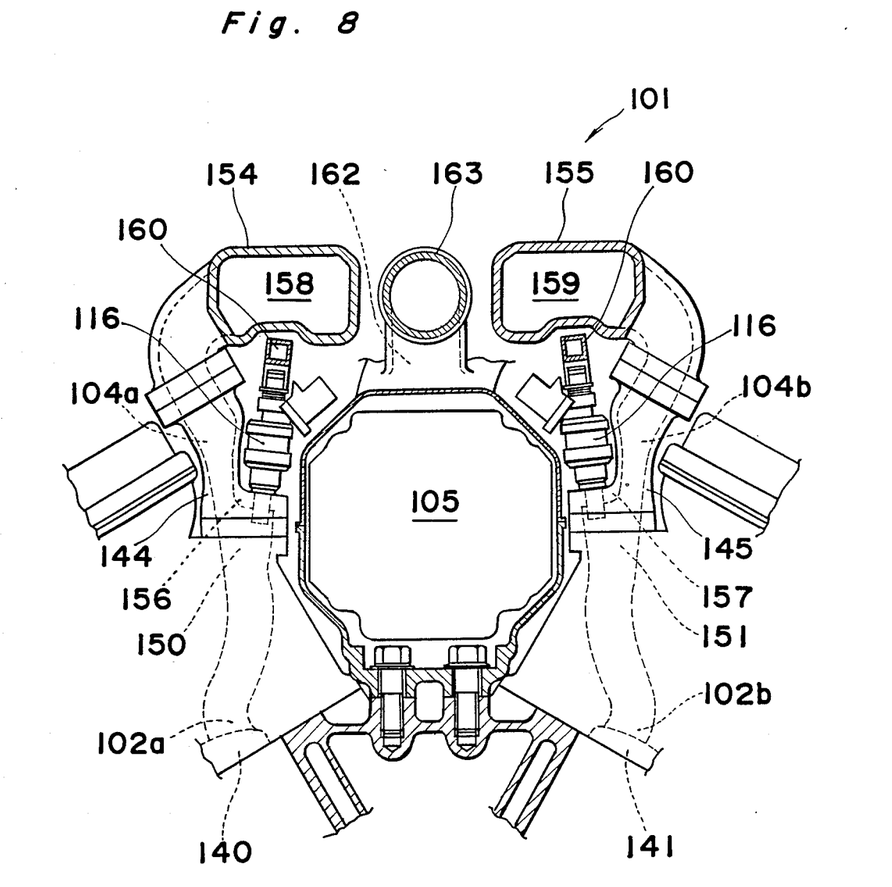
FIG. 8 is a cross-sectional view taken along the line VIII—VIII in FIG. 5.
Figure 9:
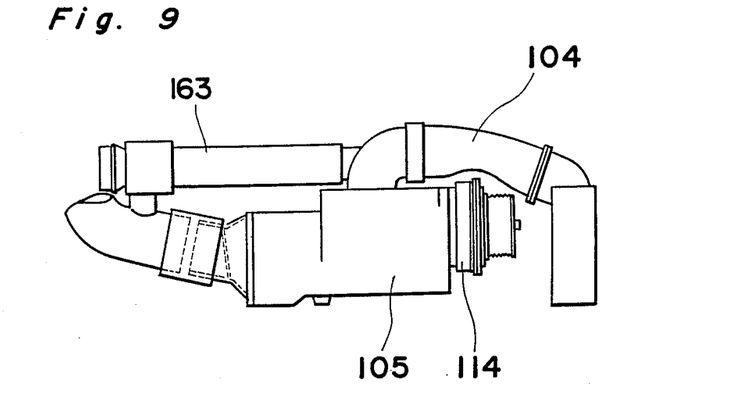
FIG. 9 is a fragmentary side elevational view of connections between a mechanical supercharger and a by-pass passage and intake passages in the arrangement of FIG. 5.

In the throttle body 171, the throttle valve 107 referred to earlier (FIG. 1) is provided. The auxiliary throttle valve 109, also referred to earlier (FIG. 1) and coupled by a linkage with said throttle valve 107, is provided at the inlet portion 164 of the supercharger 105. The suction pipe 170 is formed with an upwardly directed opening 162 at a position immediately behind the connection thereof to the supercharger 105 (FIG. 8). In the opening 162, the by-pass valve 113 of a diaphragm type is provided. A by-pass pipe 163 for connecting the opening 162 of the suction pipe 170 and the delivery portion 165 of the supercharger 105 through the by-pass valve 113 is also provided.

As shown in FIGS. 4 and 8, the by-pass pipe 163 is located at an upper portion of the engine between the cylinder banks L and R and extends in the longitudinal direction of the engine 101 approximately horizontally between the left and right side manifold pipes 154 and 155. Thus the by-pass pipe 103 is relatively short so as not to take up an excessive amount of space.

Since the delivery side of the supercharger 105 is connected through the inter-cooler 106 to the manifold pipes of the left and right side cylinder banks by long and independent intake passages at the left and right portions thereof, a large resonance effect is available, contributing to a superior torque characteristic, especially during low speed operation of the engine. Although such intake passages are considerably long, a compact piping structure is achieved on the whole.

Figure 10:
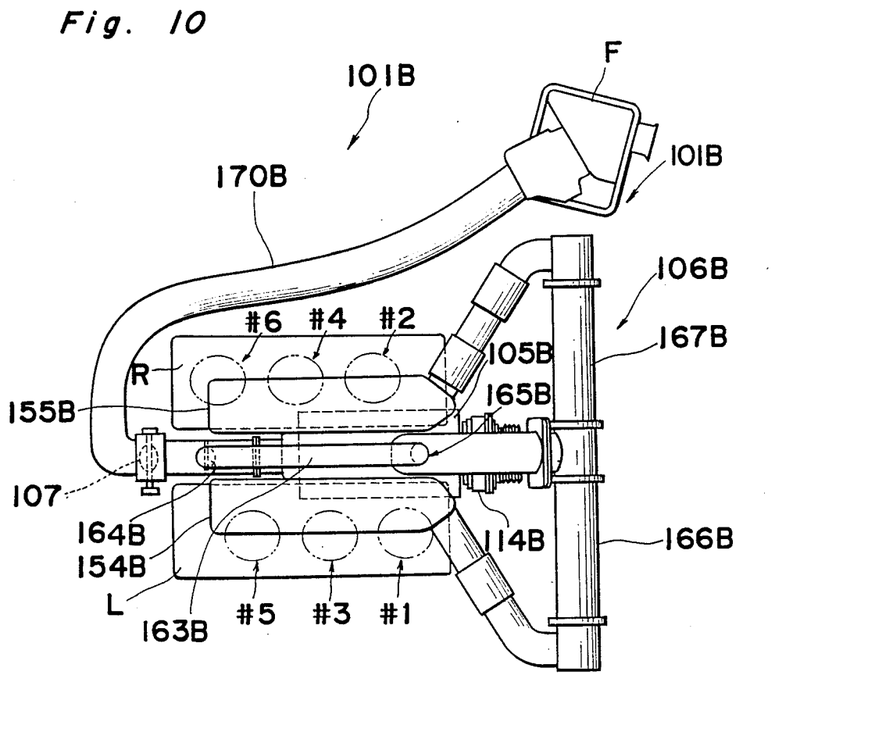
FIG. 10 is a view similar to FIG. 5, which particularly shows a modification thereof.

Referring further to FIG. 10, there is shown a modification of the arrangement as described so far, with like parts in the foregoing embodiment being designed by like reference numerals for brevity of explanation.

In the modified arrangement of FIG. 10, a common intake passage 170B is provided to supply the intake gas to the first to sixth cylinders #1 to #6. In this intake passage 170B there are sequentially provided, from the upstream side, the air cleaner F for removing dust in the intake gas and the throttle valve 107 to be selectively opened or closed in association with an accelerating pedal (not shown). The passage 170B is further connected to the mechanical system supercharger 105B of a snake-type as shown.

The supercharger 105B is disposed in the V-shaped space defined between the left and right side cylinder banks L and R and extends in the longitudinal direction of the internal combustion engine 101B. The common intake passage 170B is connected, at the upstream side of the supercharger 105B, to the inlet port 164B of the supercharger 105B in a generally horizontal direction from the rear of the engine. On the other hand, the common intake passage 170B, at the downstream side of the supercharger 105B, is connected to the delivery port 165B open to the supercharger close to the forward end of the supercharger 105B. It is to be noted here that, although the common intake passage 170B at the downstream side of the supercharger 105B rises upwardly from the portion thereof connected to the delivery port 165B, it curves toward the front immediately downstream of said connected portion so as to extend in the longitudinal direction of the engine 101B, whereby the supercharger 105B and the common intake passage 170B at the upstream side and the downstream side thereof hardly project to the upper portion of the engine 101B, and are advantageously disposed within the V-shaped space between the cylinder banks L and R thereby rendering the engine compact.

In the above arrangement of FIG. 10, since the supercharger is disposed in the V-shaped space, with the inter-cooler 106B being provided immediately in front of the engine 101B, not only is the suction system compact, but the overall intake passage length is advantageously short so as not to be a great cause of suction resistance and thereby facilitate fuel performance.

Moreover, due to the disposition of the inter-coolers 166B and 167B for cooling the intake air to the left and right side cylinder banks L and R so as to provide the maximum projection area in the direction of the flow of the atmosphere when the vehicle is running, a sufficient amount of cooling air may be fed to said inter-coolers for improving the filling efficiency by perfectly cooling the intake gas.

Furthermore, since the intake passage between the cooler 166B for cooling the intake air to left side cylinder bank L and the respective cylinders #1, #3 and #5, and the intake passage between the cooler 167B for cooling the intake air to right side cylinder bank R and the respective cylinders #2, #4 and #6 have predetermined lengths so as to effectively utilize the inertia effect of the suction, filling efficiency is also improved.

It should be noted here that the foregoing embodiments have been described with reference to an internal combustion engine provided with a Lysholm type supercharger, the present invention is not limited in its application to such an engine but may be readily applied to internal combustion engines provided with other types of mechanical superchargers.

It is needless to say that the present invention may be modified in various ways within the scope of the appended claims.

By way of example in the foregoing embodiments, although the present invention has been described as applied to the DOHC (double overhead cam shafts) type of engine provided with two overhead cam shafts for the respective cylinder banks L and R, the present invention is not limited to a DOHC type of engine but may be applied to a so-called SOHC (single overhead cam shaft) type engine which utilizes a common cam shaft for both the exhaust and intake valves.

Moreover, instead of the supercharger 105 being the auxiliary unit disposed at the upper portion of the engine in the space between the cylinder banks L and R for example, an alternator, etc. driven by the engine may be disposed there so as to constitute the auxiliary unit.

Since the present invention has the structure described above, it is possible to minimize the size of the V-type engine by disposing the auxiliary unit between the left and right side cylinder banks, to suppress the suction resistance, and minimize adhesion of fuel components onto the wall surface. Moreover, according to the present invention, the suction system is compact due to the shortness of the by-pass piping for the mechanical type supercharger, and suction resistance is suppressed.

Furthermore, according to the present invention, since in the V-type internal combustion engine including the pair of upwardly diverging cylinder banks and the auxiliary unit disposed at an upper portion in the space defined between the cylinder banks, the intake portions are inclined inwardly by a predetermined angle with respect to respective cylinder axes, extend upwardly in a generally vertical direction so as not to interfere with the auxiliary unit, and are connected to the cylinder communicating portions, the auxiliary unit such as the supercharger or the like may be installed immediately above the space between the respective cylinder banks. Thus, not only is the total height of the engine minimized as far as possible, but also the necessary suction is secured through the suppression of suction resistance.

Although the present invention has been fully described in connection with the preferred embodiments thereof with reference to the accompanying drawings, it is to be noted that various changes and modifications will become apparent to those skilled in the art. Such changes and modifications are to be understood as included within the scope of the present invention as defined by the appended claims unless they otherwise depart therefrom.

What is claimed is:

1. In a V-type internal combustion engine including a pair of upwardly diverging cylinder banks defining cylinders of the engine, and an auxiliary unit disposed in a space defined between said cylinder banks, a suction arrangement comprising engine structure defining intake ports contiguous to said cylinders and intake passages extending generally vertically from and contiguous to said intake ports, respectively, said intake passages disposed at inner sides of said cylinder banks confronting the V-shaped space opposite sides of said auxiliary unit, respectively, and distributing means connected to said intake passages at upper ends thereof opposite said intake ports, respectively, for distributing intake gas for the engine into said intake passages.

2. The suction arrangement in the V-type internal combustion engine as claimed in claim 1, wherein said distributing means comprises a respective manifold communicating with all of the intake passages disposed on the inner side of each of said cylinder banks, each said respective manifold disposed horizontally and extending longitudinally of the engine.

3. The suction arrangement in the V-type internal combustion engine as claimed in claim 1, wherein said intake passages each have a portion thereof inclined laterally inwardly of the engine from the respective intake port contiguous thereto toward the V-shaped space.

4. In a V-type internal combustion engine including a pair of upwardly diverging cylinder banks defining cylinders of the engine, and an auxiliary unit disposed in a space defined between said cylinder banks, a suction arrangement comprising engine structure defining intake ports contiguous to said cylinders and intake passages extending generally vertically from and contiguous to said intake ports, respectively, said intake passages disposed at inner sides of said cylinder banks confronting the V-shaped space opposite sides of said auxiliary unit, respectively, each of the intake passages having a connecting portion that is curved such that said connecting portion extends laterally outwardly of the engine as taken from the end of said portion nearest to the intake port contiguous thereto, and a respective fuel injector for injecting fuel disposed laterally inwardly of each said curved connecting portion in the engine and directed to inject fuel toward the intake port contiguous to the curved connecting portion.

5. In a V-type internal combustion engine as claimed in claim 4, further comprising intake valves associated with said intake ports, respectively, said valves movably supported in the engine between positions which open said intake ports to said intake passages contiguous thereto and block said intake ports from being open to said intake passages contiguous thereto, each said fuel injector being directed toward a respective one of said intake valves in the position at which the intake valve blocks a said intake port from being open to the intake passage contiguous thereto.

6. In a V-type internal combustion engine including a pair of upwardly diverging cylinder banks defining cylinders of the engine, and an auxiliary unit disposed in a space defined between said cylinder banks, a suction arrangement comprising engine structure defining intake ports contiguous to said cylinders and intake passages extending generally vertically from and contiguous to said intake ports, respectively, said intake passages disposed at inner sides of said cylinder banks confronting the V-shaped space opposite sides of said auxiliary unit, respectively, each of the intake passages having a connecting portion that is curved such that said connecting portion extends laterally outwardly of the engine as taken from the end of said portion nearest to the intake port contiguous thereto, and a distributing means connected to each said connecting portion for distributing intake gas for the engine into said intake passages.

7. In a V-type internal combustion engine including a pair of upwardly diverging cylinder banks defining cylinders of the engine, a suction arrangement comprising a supercharger disposed in a generally V-shaped space defined between the cylinder banks and extending longitudinally of the engine for pressurizing charges of air flowing in an intake flow direction in the suction arrangement toward the cylinders of the engine, said supercharger having an inlet defining a suction port at the rear of the supercharger with respect to the engine and an outlet defining a delivery port at the front of the supercharger with respect to the engine, a common intake passage connected upstream of the supercharger with respect to said intake flow direction to the suction port of said supercharger and also connected downstream of the supercharger with respect to said intake flow direction to the delivery port of said supercharger, and an intercooler for cooling the charges of air pressurized by said supercharger, said intercooler including an inlet portion to which said common intake passage extends from said delivery port of the supercharger and is connected, said inlet portion being disposed at the front of the engine and centrally thereof with respect to the width-wise direction of the engine, and two intake gas coolers extending longitudinally opposite one another from said inlet portion in the width-wise direction of the engine, said intake gas coolers communicating with the cylinders of the engine.

8. The suction arrangement of the V-type internal combustion engine as claimed in claim 7, wherein said intake gas coolers have ends disposed at the sides of the engine, respectively, said intercooler further includes outlet portions at the ends of said intake gas coolers, and the suction arrangement further includes manifolds extending longitudinally of the engine adjacent said cylinder banks and communicating with all of the cylinders defined by said cylinder banks, respectively, and a respective branch passage extending between and connected to a respective one of the outlet portions of said intercooler and a respective one of said manifolds.

9. In a V-type internal combustion engine including a pair of upwardly diverging cylinder banks defining cylinders of the engine, a suction arrangement comprising a supercharger disposed at an upper portion of the engine for pressurizing charges of intake air flowing in the suction arrangement toward the cylinders of the engine, said supercharger having an inlet defining a suction port at the rear of the supercharger with respect to the engine and an outlet defining a delivery port at an upper portion of the supercharger, a suction pipe connected to said supercharger for introducing intake air into the suction arrangement, an intercooler disposed in front of said supercharger with respect to the engine, said intercooler operatively connected to and extending between said supercharger and the cylinders of the engine for cooling the charges of air pressurized by said supercharger and flowing toward the cylinders of the engine for cooling the charges of air pressurized by said supercharger and flowing toward the cylinders of the engine, and a bypass pipe extending between and connected to said suction pipe and said delivery port for allowing intake air introduced into the suction arrangement by said suction pipe to bypass said supercharger.

10. The suction arrangement in the V-type internal combustion engine as claimed in claim 9, wherein said supercharger is a screw type of supercharger.

11. The suction arrangement in the V-type internal combustion engine as claimed in claim 9, wherein said supercharger comprises a driving pulley for driving the supercharger via belts connected to the driving pulley and to a crank shaft of the engine.

* * * * *